(12) United States Patent
Scism et al.

(10) Patent No.: US 7,318,388 B2
(45) Date of Patent: Jan. 15, 2008

(54) INTEGRATED MARINE PERFORMANCE SYSTEM

(76) Inventors: Randy Mark Scism, 165 Enterprise Dr., Wentzville, MO (US) 63385; George Edward Scism, 2164 Yandell Cove Rd., Kirbyville, MO (US) 65679

( * ) Notice: Subject to any disclaimer, the term of this patent is extended or adjusted under 35 U.S.C. 154(b) by 0 days.

(21) Appl. No.: 11/123,921

(22) Filed: May 6, 2005

(65) Prior Publication Data

US 2005/0247251 A1 Nov. 10, 2005

Related U.S. Application Data

(60) Provisional application No. 60/568,982, filed on May 7, 2004.

(51) Int. Cl.
*B63B 1/16* (2006.01)
*B63B 1/20* (2006.01)

(52) U.S. Cl. .................. 114/273; 114/284; 114/288

(58) Field of Classification Search ............. 114/67 R, 114/67 A, 283, 284, 288, 289, 290
See application file for complete search history.

(56) References Cited

U.S. PATENT DOCUMENTS

| | | | | |
|---|---|---|---|---|
| 2,804,038 | A | * | 8/1957 | Barkla ................... 114/272 |
| 3,146,752 | A | * | 9/1964 | Ford ..................... 114/67 A |
| 3,221,831 | A | | 12/1965 | Weiland .................. 180/117 |
| 3,918,382 | A | * | 11/1975 | Austin ................... 114/273 |
| 4,827,862 | A | * | 5/1989 | Enriquez ................ 114/273 |
| 4,870,919 | A | | 10/1989 | Alison |
| 4,926,778 | A | * | 5/1990 | Johnston ................ 114/273 |
| 4,941,419 | A | | 7/1990 | Corti |
| 4,944,240 | A | | 7/1990 | Morris |
| 5,415,365 | A | * | 5/1995 | Ratliff ................... 244/101 |
| 5,655,473 | A | | 8/1997 | Arvilla |
| 5,850,793 | A | | 12/1998 | Bronson |
| 5,979,824 | A | * | 11/1999 | Gagliano et al. .......... 244/87 |

FOREIGN PATENT DOCUMENTS

DE 19721592 A1 11/1998

* cited by examiner

*Primary Examiner*—Sherman Basinger
(74) *Attorney, Agent, or Firm*—Klotzer Patents; Daniel Klotzer

(57) ABSTRACT

A system for improving the performance of a powered boat that includes both methods and apparatuses that provide a powered boat ways to stabilize, control, and optimize the powered boat's performance when the powered boat is in powered motion. The system provides capabilities of enhancing the powered boat's performance by responding to both aerodynamic and hydrodynamic effects upon the powered boat when the powered boat is in motion. Some embodiments of the system are capable of altering its way of responding to aerodynamic effects while the powered boat is in powered motion, other embodiments are capable of altering the powered boat's response to hydrodynamic effects while the powered boat is in powered motion, and still other embodiments are capable of altering the powered boat's response to both aerodynamic and hydrodynamic effects while the powered boat is in powered motion. Certain embodiments of the system are capable of utilizing aerodynamic elements that operate on the air stream flowing within a tunnel formed within a multihull of a powered boat, while other embodiments are capable of mitigating the effects of water impacts upon the roof of a tunnel formed within a multihull powered boat. Still other embodiments are capable of responding to aerodynamic effects by interacting with portions of the air stream that passes above the boat while mitigating the potential for negative effects due to crosswinds impacting the structure which rises above a deck of the powered boat.

23 Claims, 7 Drawing Sheets

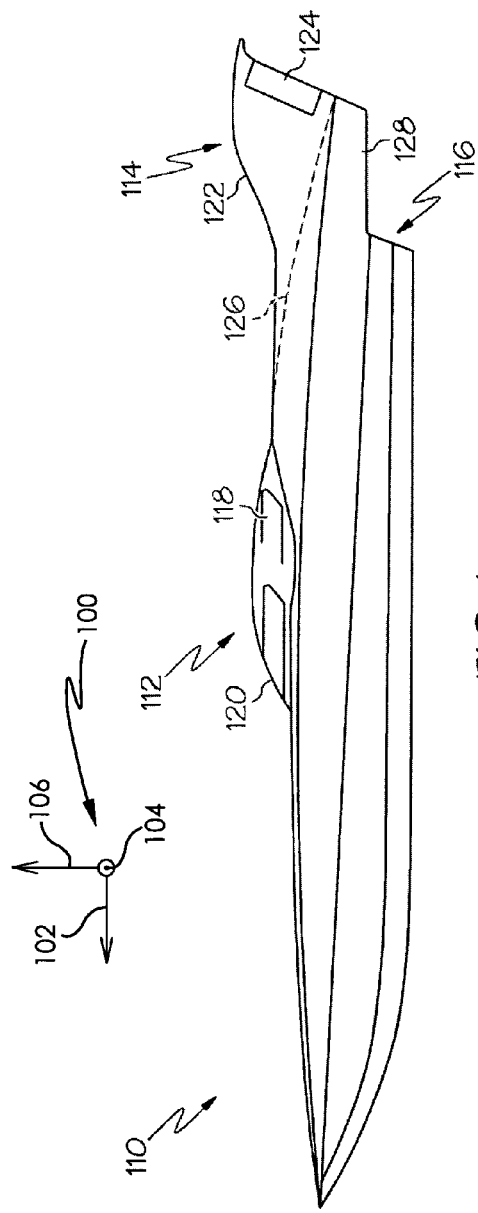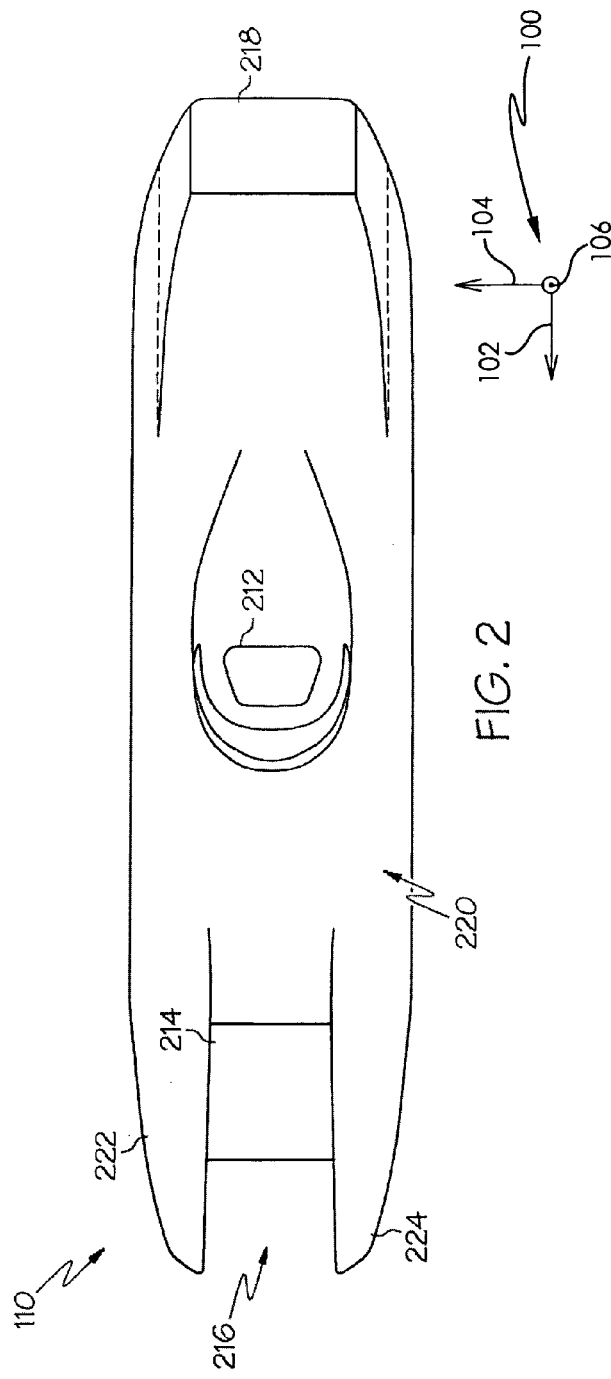

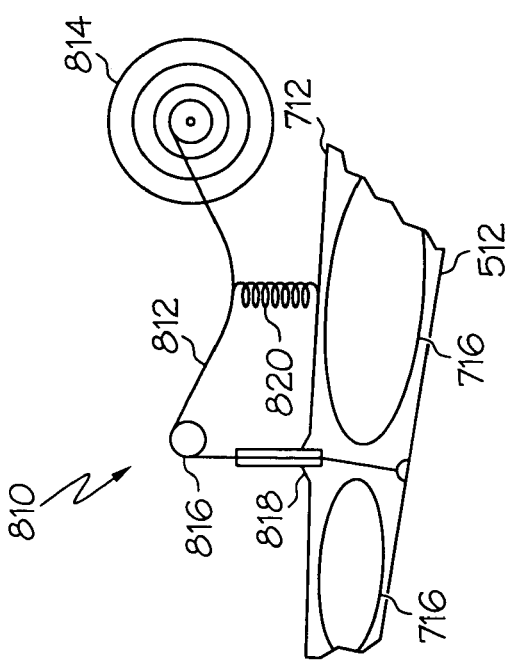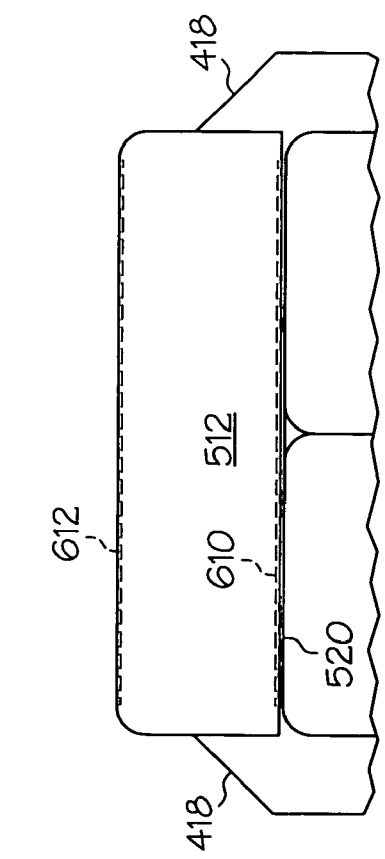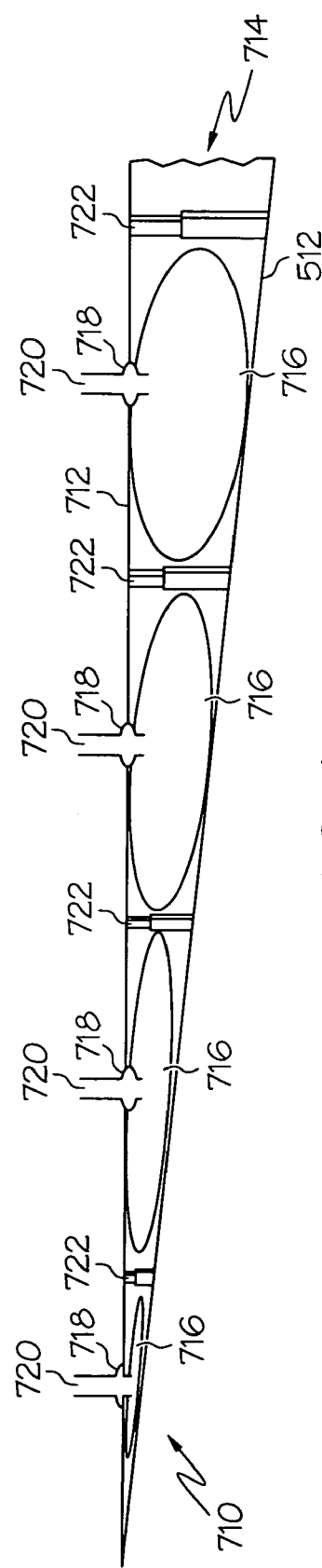

INTEGRATED MARINE PERFORMANCE SYSTEM

CROSS-REFERENCE TO RELATED APPLICATIONS

This non-provisional patent application claims the benefit of priority from U.S. provisional patent application Ser. No. 60/568,982, inventors Scism, et al, filed on May 7, 2004.

STATEMENT REGARDING FEDERALLY SPONSORED RESEARCH OR DEVELOPMENT

Not applicable.

BACKGROUND OF THE INVENTION

1. Field of the Invention

The present invention relates generally to systems for controlling and improving the performance of power water craft by integrating the utilization of aerodynamic effects with the utilization of hydrodynamic effects, and more particularly by enabling these utilizations of aerodynamic and hydrodynamic effects to be alterable, and where said alterable utilizations are capable of functioning while the watercraft is in operation.

2. Related Art

Efforts to improve the technologies utilized for marine transportation probably date back to the very advent of marine transportation. Among the more common of these types of attempts are those that strive to improve a boat's velocity of travel, either in terms of its absolute speed or its efficiency at a given speed, as well as those that attempt to enhance a boat's controllability at a given speed. In the present context, the term "boat" will be used generically to connote virtually any form of marine transportation, despite the convention in certain circumstances to apply this term with a more limited range of meaning. Typical ways to improve a boat's absolute speed include boosting the power of a motor boat's engine(s) and reducing the boat's weight. Usual means employed to increase a boat's efficiency include modifing hull shapes and surface coatings to lessen the boat's drag in the water. Methods of enhancing a boat's controllability have customarily involved systems that utilize hydrodynamic effects, such as rudders.

Whatever the speed with which a boat travels across the water, hydrodynamic factors will have a significant impact upon the boat's performance. Among the more critical of these factors are a boat's displacement, and how that displacement may vary with the boat's speed of travel, as well as the water environment that the boat is traveling through, with wave conditions and currents being foremost among these factors. The effects of hydrodynamic factors are also not static for a given boat and set of water conditions, since these effects will vary greatly depending on, among other things, the speed the boat is traveling and the direction the boat is heading relative to the predominant directions of the major waves and currents at that time and place. As the boat accelerates, it will usually ride higher in the water, with a lesser overall dynamic displacement, and the contact area between the boat and the water is also usually lessened and moved more towards the rear of a boat (for a customary rear drive arrangement).

Hydrodynamic factors are one of the major issues that impact on hull shape designs. The classic monohull V-bottom shape has the virtue of being able to lessen the impact of higher wave heights, but at the cost of relatively greater displacements, and hence less efficiency as the boat's speed increases. An alternative approach is to employ what are broadly referred to as multi-hull shapes, such as catamarans and trimarans. While these hull shapes may have a lesser ability to mitigate the effects of larger waves, they present other advantages that are particularly beneficial for higher speed boat travel. Multi-hulls tend to have decreased dynamic displacements, and they tend to reduce their hydrodynamic drag more quickly as their speed increases than would a comparable monohull V-bottom at the same speed. In the present context, the technologies described herein will be generally addressed to applications for catamarans, but it should be understood that this is merely for reasons of expediency of discussion, since the technologies discussed herein in reference to catamarans are also applicable to other types of multi-hulls and monohulls, with suitable modifications that will be readily apparent to those of skill in the art.

One significant effect that enables a catamaran to reach high speeds more quickly and efficiently than a monohull is due to the airflow into, and through, a catamaran's tunnel. As the catamaran picks up speed, the air pressure in the catamaran's tunnel increases, thereby providing a degree of lift to the boat and lessening its drag in the water. Hence, catamarans are often able to reach a planning attitude faster than a comparable V-hull does. This air-pressure buoyancy effect illustrates that aerodynamic factors can also exert significant effects on a boat traveling at speed. The relative importance of aerodynamic effects only increases with speed, so that at very great velocities the importance of the aerodynamic effects on a boat's performance can rival or exceed the importance of hydrodynamic effects. Aerodynamic effects such as the aerodynamic lift in a catamaran's tunnel at speed can also present significant impediments to maintaining optimal control. The angle of attack that a catamaran travels at can be critical, as becomes apparent in instances where a catamaran experiences a blow-over due to its attaining too great a pitch angle relative to the horizontal. However, if the pitch angle becomes too small, the boat may lose efficiency (and hence speed) and it may even nose dive into the next wave. Since wind and wave conditions are constantly varying, and boats typically change headings, there is an unmet need for a system that can adjust to both hydrodynamic and aerodynamic factors in an integrated manner, and that can accomplish these integrated adjustments in real time as the boat is in motion.

One prior art attempt to mitigate the risks of a catamaran flipping over at high speed is disclosed in J. K. Morris, U.S. Pat. No. 4,944,240 wherein the inventor patented a pair of cutout vents in the rearward roof portion of the tunnel. These vents are intended to provide a means for increased air escape from the tunnel of a catamaran when the catamaran's bow raises too high. This system is static and is essentially a variation in the topography of the tunnel that is intended to primarily become effective only when the boat is in danger of flipping over.

A prior art technology that is more germane to the present invention is a tunnel-flap innovation (not patented) invented by the present applicants. The tunnel-flap is a primarily planar element that depends rearwardly from the lower rearmost portion of the center section of a catamaran's transom that meets the tunnel roof, and is attached to the transom at the tunnel flap's leading edge. The attachment of the tunnel flap to the catamaran functions as a hinge with a horizontal rotational axis that runs parallel to the catamaran's transom, and enables the tunnel flap to be selectively raised or lowered to thereby provide the capability of selectively restricting the flow of air from the catamaran's tunnel to increase dynamic air pressure in the tunnel and further provide the capability of extending the effective aerodynamic length of the tunnel. The tunnel flap also moves the aerodynamic center of lift aft as its trailing edge is lowered. At lower speeds, the tunnel flap can be lowered so as to increase the rate at which air pressure in the tunnel builds up and thereby hasten the process of bringing the catamaran into a planing attitude. Once at higher speeds, the tunnel flap's position can be modified, depending on the conditions, to improve or control the catamaran's performance. While providing an additional degree of control of aerodynamic effects, the tunnel flap is an add-on component that can only modify the existing catamaran's aerodynamic and hydrodynamic properties to a limited degree. A more desirable system would enable the operator of a boat to alter a variety of control elements either individually or in varying combinations, even while operating at high speeds. Such a system would provide the capability of tailoring a boat's performance to differing conditions and criteria, and thereby facilitate optimizing the boat's performance for speed, efficiency, controllability, and safety.

SUMMARY OF THE INVENTION

The present invention is comprised of a system that provides novel means of interacting with aerodynamic forces that are experienced by a boat traveling at speed, and integrating operation of these novel aerodynamic interacting means with the varying hydrodynamic interactions that are also experienced by the boat. The hydrodynamic interactions experienced by the boat are well known to those of skill in the art, and among the differing conventionally employed means of effecting these interactions are hull shapes, hull surfaces, supplementary hull elements (such as hydrofoils and hydrodynamic trim tabs), differing types of drives (e.g. propellers or water jets), drive power and throttle controls, and variable drive trims (wherein the angle of the drive thrust relative to the boat can be varied).

The present invention's means of interacting with aerodynamic effects can be divided into two broad categories. The first category involves interacting with the air stream that passes between the boat and the water, and the second category involves interacting with the air stream that passes around the boat, but not between the boat and the water. For the first category, the present invention chiefly applies to multi hull boats that include at least one tunnel within the hull. The second category also applies to these kinds of boats, as well as to other boats that do not comprise a multi hull or may not include a tunnel within their hull. The systems of the present invention, whether addressed to means of either, or both categories, include both methods and apparatuses, and are not limited to the particular physical details of the illustrative embodiments disclosed herein.

A first type of the first category of means of interacting with aerodynamic effects involves the utilization of an alterable tunnel tab. The tunnel tab is an alterable tunnel roof that can be adjusted, in operation, both upwards and downwards. Movement of the tunnel tab causes the effective height of the tunnel to change, so that when the tunnel tab is raised the tunnel cross-section is increased where the tunnel tab is disposed, and when the tunnel tab is lowered, the tunnel cross-section is correspondingly decreased where the tunnel tab is disposed. Since the performance of a catamaran can be greatly affected by the air flow through its tunnel, particularly at high speeds, movement of the tunnel tab during operation enables the catamaran's operator to command a significant new means of altering the catamaran's performance. Increasing the catamaran's tunnel cross-section enables the operator to decrease the air pressure within the boat's tunnel, even without changing the boat's pitch attitude. Among the advantages that can be thus attained are reduced risks of flip-over at high speeds; improved capabilities of tuning the catamaran's pitch to account for water and air conditions, plus the capability of tailoring the boat's pitch to achieve particular desired performance criteria; and integrating a tuning of the tunnel tab's disposition with drive angle adjustments to enable optimal drive angle choices that might otherwise be impractical.

Besides integrating with the variations in a boat's drive angle, the alterable tunnel tab can also provide an important shock moderating effect. While catamarans can provide significant performance advantages over V-hulls, they can also suffer from an inherent problem when they encounter sizeable waves. When a catamaran is traveling across relatively sizeable waves, the boat can land heavily on the roof of its tunnel in between waves. A V-hull in that situation has a significant dead rise angle impacting the water at any instant as it "cuts" into the water, and hence does not experience so great a shock at any given moment, even when falling heavily into the trough between waves. But a catamaran can experience a very jarring impact when the tunnel roof hits the water, since the contact area is essentially flat and broad. These impacts can even be so severe as to injure the occupants of the catamaran, and cause the boat to dive nose down under the water, or an uneven impact can cause a loss of lateral control potentially resulting in a roll over. The alterable tunnel tab provides an additional benefit in these circumstances by providing a built in shock-absorbing feature. The alterable tunnel tab's capability of moving up and down is capable of being augmented with a supplementary movement capability, at any disposition and which can be automatic, so that it can travel upward in response to impacting the water surface. This additional movement capability is also capable of incorporating a shock mitigating mechanism that can moderate the force of impact with the water surface and thereby reduce the magnitude of these sometimes severe shocks on the boat and/or its occupants.

A second type of the first category of means of interacting with aerodynamic effects involves altering other aspects of the hull that contribute to defining the cross-section of the tunnel. An example of one type of these other hull aspects are the interior sides of the sponsons. Sections of the interior sides of the sponsons can also be constructed to be moveable so that they can move inward or outward and thereby also modify the tunnel's cross-section.

Embodiments of the first category of means of interacting with aerodynamic effects include moveable elements that can be either constructed of a single part that moves essentially as a whole, or constructed of multiple parts that can move in concert or independently. Additionally, any of these parts that comprise the moveable elements are further capable of being constructed with articulations that provide further capabilities of independent movement.

The second category of the present invention's means of interacting with aerodynamic effects can be characterized, among other ways, according to how the aerodynamic interacting elements are integrated within the boat's structure. Although these two ways of characterizing the aerodynamic interacting elements are not exclusive of each other, they are instructive for purposes of describing certain features of the present invention. The distinction between the two ways of characterizing these second category elements involves how they are disposed within the air stream that the boat passes through. When the element is disposed so that the air stream cannot pass between the element and the bulk of the rest of the boat, it will be considered as characterized by the first way of disposition; whereas when the element is disposed so that the air stream can pass, at least in part, between the element and the bulk of the rest of the boat, it will be considered as characterized by the second way of disposition. For purposes of clarity of description only, if an element can be characterized in the first way it will be considered to be distinct from elements that can be characterized in the second way. It should be understood though, that this distinction is not reflective of an inability of an element characterized in the first way to be alternatively disposed so that it can also be characterized in the second way, nor is it reflective of an inability of an element characterized in the second way to be alternatively disposed so that it can also be characterized in the first way. A typical example of an element characterized in the first way would be a cockpit enclosure that is shaped so as to exert a selected aerodynamic effect, while a typical example of an element characterized in the second way would be a rear wing disposed above a rear portion of the boat.

Integrated Marine Performance Systems according to the present invention are capable of including an array of aerodynamic elements. Among these elements are wings disposed in varying dispositions such as front or rear, canards, horizontal or aerodynamic extensions, alterable tunnel elements (for those boats that have tunnels formed within their hulls) such as the aforementioned tunnel tab, air shunts or vents, and faring structures specifically formed to produce an aerodynamic effect. Any or all of these elements that comprise a particular embodiment of the present invention may also be capable of being alterable when in operation, so that the aerodynamic effect produced by the element(s) can be adjusted to optimize the boat's performance for a specific set of conditions or a specific set of performance objectives.

Additionally, in various embodiments of the present invention a particular element, such as a rear wing, may be a single contiguous structure, or may be constructed of multiple constituents that function in concert. Aerodynamic structures of this type, for example wings with ailerons or flaps, are well know in the art and are also within the scope of the present invention. However an individual aerodynamic element is structured, whether with multiple constituents or with a single contiguous member, whether articulated or not, or some combination thereof, the utilization of any such aerodynamic element in the Integrated Marine Performance System also falls within the scope of the present invention. Additionally, it should be further understood that combinations of these aerodynamic elements in varying permutations also lie within the scope of the present invention.

The Integrated Marine Performance System provides novel capabilities to meet an assortment of objectives. A first object of the present invention is to enable a catamaran's operator to alter the characteristics of a tunnel's aerodynamic behavior while the boat is in operation at any speed. The alteration of the tunnel's aerodynamic behavior is further capable of being tuned in concert with the operation of the catamaran's other performance factors, such as drive angle, to provide an integrated approach to optimizing the catamaran's hydrodynamic and aerodynamic performance.

A second object of the present invention is to provide a catamaran with a moveable tunnel structure that is capable of mitigating the impact force that occurs when the catamaran tunnel bottoms out against the water surface.

A third object of the present invention is to provide a boat with an alterable rear wing that can be altered to modify the rear wing's, and hence the boat's, aerodynamic functioning while the boat is in operation at any speed. The alteration of the rear wing's aerodynamic behavior is further capable of being tuned in concert with the operation of the catamaran's other performance factors, such as drive angle, to provide an integrated approach to optimizing the catamaran's hydrodynamic and aerodynamic performance.

A fourth object of the present invention is to provide a boat with an alterable front wing that can be altered to modify the front wing's, and hence the boat's, aerodynamic functioning while the boat is in operation at any speed. The alteration of the front wing's aerodynamic behavior is further capable of being tuned in concert with the operation of the catamaran's other performance factors, such as drive angle, to provide an integrated approach to optimizing the catamaran's hydrodynamic and aerodynamic performance.

A fifth object of the present invention is to provide a safety margin to a boat's operator(s) by enhancing aerodynamic stability. The present invention's enhanced control capabilities due to the utilization and integration of aerodynamic effects can help to avoid instabilities that affect many prior art boats when, for example, these prior art boats impact waves (because an impact's effects can interfere with the prior art boats' abilities to maintain an optimal attitude); as well as instabilities, particularly aerodynamically generated instabilities, that can arise when these prior art boats' speeds increase beyond their capabilities to maintain optimal control.

A sixth object of the present invention is to provide capabilities for at least one of the alterable elements that comprise at least one of the embodiments of the present invention to optionally be pre-set prior to operating the boat; to be manually controlled while the boat is under way; to be selectively responsive to environmental effects (such as the air pressure within the tunnel or impacts with the water surface); or to be automatically controlled by servo systems, of types that are well known in the art, that can utilize various components including gyroscopes, accelerometers, GPS systems, air pressure or air velocity sensors, magnetometers or magnetic compasses, and virtually any other type of well known sensing system that is capable of providing information relating to the boat's operating characteristics.

A seventh object of the present invention is to provide capabilities to dispose structural support elements, such as those that support a rear wing, in a manner that enables the structural support elements themselves to be capable of avoiding potentially destabilizing effects from side winds, as well as provide additional multiple control capabilities.

Other objects and features will be in part apparent and in part pointed out hereinafter.

BRIEF DESCRIPTION OF THE DRAWINGS

FIG. 1 depicts a side view of a catamaran boat first embodiment 110 according to the present invention.

FIG. 2 depicts a top plan view of the catamaran boat first embodiment 110 according to the present invention.

FIG. 6 depicts a forward facing view of the rearmost portion of the catamaran boat tunnel with a tunnel tab fully deployed downward in the catamaran boat first embodiment 110.

FIG. 7 depicts a cross-section side view of a first combination embodiment 710 of the tunnel tab 512.

FIG. 8 depicts a partial side cross-section view of a mechanical control device 810 of a second combination embodiment.

DETAILED DESCRIPTION OF THE PREFERRED EMBODIMENTS

In the following description, identical numbers indicate identical elements. Where an element has been described in one Figure, and is unaltered in detail or relation in any other Figure, said element description applies to all Figures.

Figure 4:
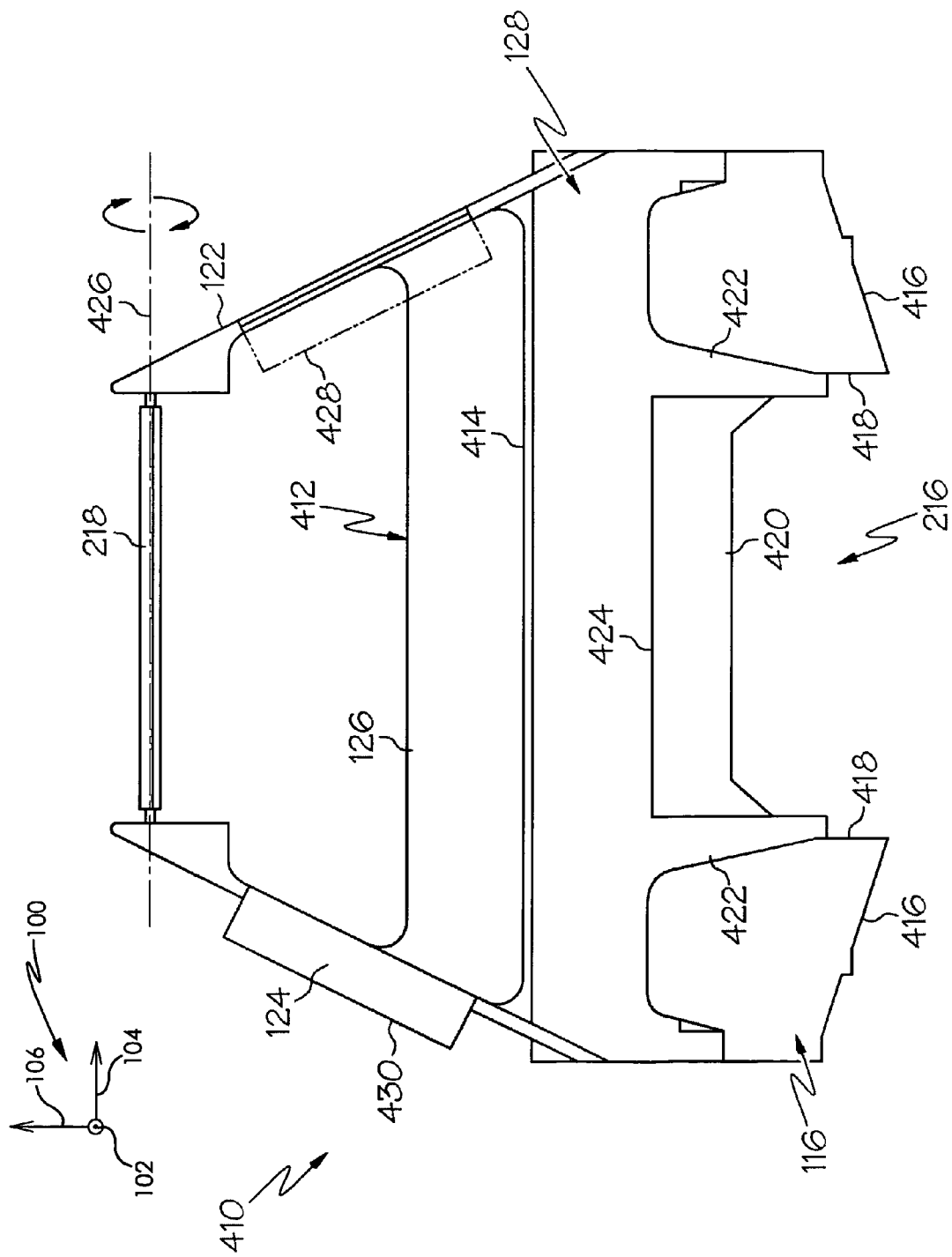
FIG. 4 is a forward facing view from behind a stern 410 of the catamaran boat first embodiment 110 of the present invention.
Figure 13:
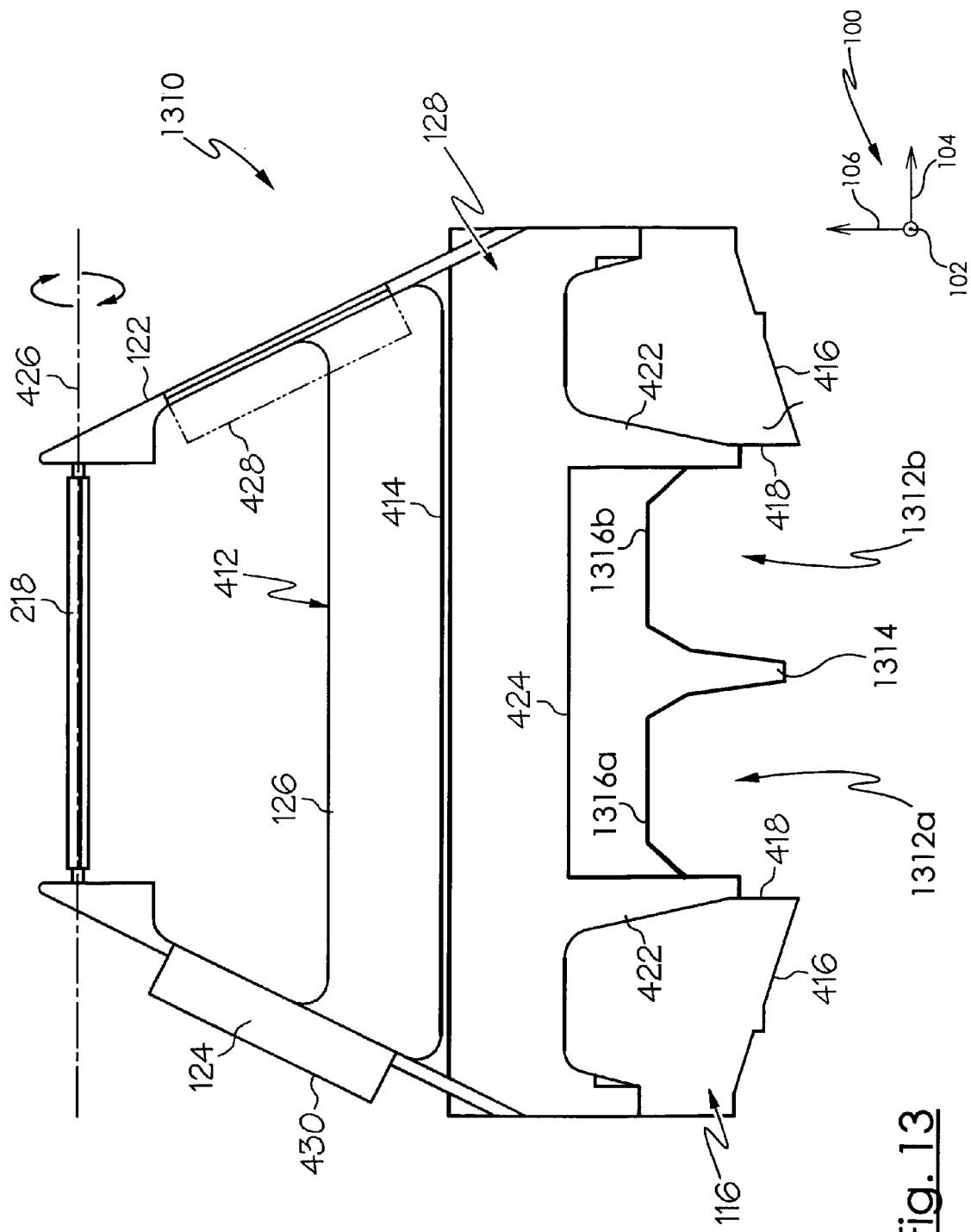
FIG. 13 is a forward facing view from behind of a stern of a catamaran boat multi-tunnel embodiment 1310 of the present invention.

In FIGS. 1, 2, 4, and 13 a coordinate system 100 is shown (with applicable rotations depending on the view shown in each figure) that defines three mutually perpendicular, boat dimensional axes. The three dimensions are defined by a longitudinal axis 102 disposed within the plane of FIG. 1 with its positive direction being to the left as shown in FIG. 1; a transverse axis 104 disposed perpendicular to the plane of FIG. 1 with its positive direction pointing out of the plane of FIG. 1 towards the viewer; and a vertical axis 106 disposed in the plane of FIG. 1 with its positive direction being in the upward direction as shown in FIG. 1. Alterations in the disposition as shown in FIGS. 2, 4, and 13 will be detailed in the following detailed descriptions of each of those figures. FIG. 1 depicts a side view of the catamaran boat first embodiment 110 according to the present invention, shown with a closed cockpit canopy 112 as is commonly utilized for competitive racing. A rear wing assembly 114 extends rearwardly beyond a transom 116. In the embodiment depicted an intake vent 118 is disposed on the side of the cockpit canopy 112 rearward of a cockpit windscreen 120. The intake vent 118 enables the catamaran 110 to provide an air supply to both its engines and any other mechanism that may utilize air pressure for operation. A pair of rising support members 122 of the rear wing assembly 114 are shown as including (optional) adjustable aerodynamic extensions 124 that are able to rotate about an inclined axis located proximate the forward edge of these aerodynamic extensions 124. In operation, when the aerodynamic extension 124 rotates, it provides an additional aerodynamic effect that is able to exert forces that include both lateral and vertical components upon the rear wing assembly 114, and can provide multiple capabilities including selectively effecting yaw, pitch, and/or roll torques. The aerodynamic extensions 124 can be deployed singly or in multiple arrangements, and when in a multiple arrangement they are also capable of being able to operate in concert and/or independently. The aerodynamic extensions 124, when in a multiple arrangement, are further capable of moving in the same direction as well as opposite directions. These various types of individual and/or coordinated movements are capable of providing an assortment of aerodynamic effects including, but not limited to, differential lift, enhanced cornering, environmental effect mitigation, and improved performance and safety. An aerodynamic deck protrusion 126 extends rearward from the proximity of the side of the cockpit and provides an additional aerodynamic effect similar to the result achieved by an airplane wing, in which the wing's upper and lower surfaces have differing topographies. The upward distension of the aerodynamic deck protrusion 126 causes the air flowing over it to move with a greater velocity, and hence provide lift that would not occur without this upward distension. The aerodynamic deck protrusion 126 slopes downward from its greatest height to the end of a tail 128 of the catamaran boat first embodiment 110, so that the downward slope of the aerodynamic deck protrusion 126 can produce a reduction in base drag. An additional reduction in drag can be optionally provided by disposing the motor exhaust (not depicted) within a lower air pressure zone produced immediately aft of the transom 116 when the catamaran boat first embodiment 110 is traveling at a significant speed.

FIG. 2 depicts a top plan view of the catamaran boat first embodiment 110, including a cockpit access hatch 212. The coordinate system 100, as shown in FIG. 2, is disposed with the longitudinal axis 102 within the plane of FIG. 1 with its positive direction being to the left; the transverse axis 104 disposed within the plane of FIG. 2 with its positive direction being in the upward direction and the vertical axis 106 disposed perpendicular to the plane of FIG. 2, with its positive direction pointing out of the plane of FIG. 2 towards the viewer. A front wing assembly 214 is disposed above a forward portion of a tunnel 216 of the catamaran boat first embodiment 110. A rear wing 218 is disposed between the upward extents of the rising support members 122. Throughout this description of the present invention, the forward 214 or rearward 218 wings are described in detail only as examples of various embodiments of the present invention, and it should be understood that either or both wings are essentially unconstrained as to the variety of ways in which they can be constructed, shaped or sized. Hence, in the remainder of the present detailed description of the drawings, the rearward wing 218 and its variations will be described in some detail, with the understanding that similar details and variations are also applicable to the construction of the forward wing 214. Either or both forward 214 or rearward 218 wings are capable of being included within the various embodiments of the present invention. A general deck 220 extends essentially from the forward tips of right and left pickle forks 222 and 224, respectively, to the rearmost extent of the catamaran boat first embodiment 110.

Figure 3:
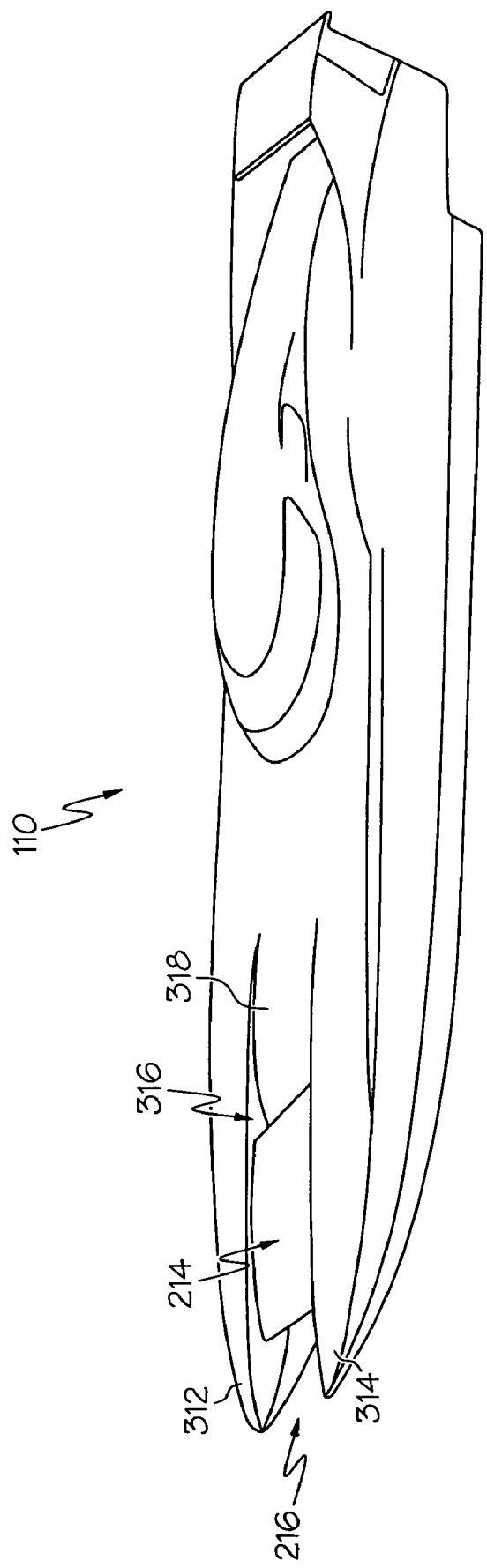
FIG. 3 is an elevated perspective view of the catamaran boat first embodiment 110.

FIG. 3 is an elevated perspective view of the catamaran boat first embodiment 110 that enables a clearer depiction of the disposition of the front wing 214. The tunnel 216 runs between a right sponson 312 and a left sponson 314. An optional air space 316 separates the rear edge of the front wing 214 from the forward deck section 318 that extends over the tunnel 216. The air space 316 enables the front wing 214 to act as an independent wing component, rather than as only a specialized forward portion of the center of the deck.

FIG. 4 is a forward facing view from behind the stem 410 of the catamaran boat first embodiment 110 of the present invention. The coordinate system 100, as shown in FIG. 4, is disposed with the longitudinal axis 102 disposed perpendicular to the plane of FIG. 4, with its positive direction pointing out of the plane of FIG. 4 away from the viewer; the transverse axis 104 disposed within the plane of FIG. 4 with its positive direction being to the right; and the vertical axis 106 disposed within the plane of FIG. 4 with its positive direction pointing upward. The rising support members 122 are fixedly interrelated with the catamaran boat first embodiment 110 at an inclination that includes non-negligible components in both the transverse and the longitudinal dimensions. The fixed interrelation of the rising support members 122 to the catamaran boat first embodiment 110 is such that their disposition relative to the longitudinal axis of the hull of the catamaran boat first embodiment 110 is fixed. The cockpit canopy 112 is not depicted in FIG. 4. FIG. 4 illustrates an example of the usual types of spatial height relationships between an uppermost level 412 of the aerodynamic deck protrusion 126 and the upper surface 414 of the general deck 220. Underside sponson surfaces 416 and internal sponson surfaces 418 define the contours of the tunnel 216. The level of the water in the tunnel 216 will vary depending on how fast the catamaran boat first embodiment 110 is traveling, the load and the water conditions, among other factors. Additionally, the level of the water in the tunnel 216 will ordinarily not be uniform from the front to the end of the tunnel 216. Importantly for the present invention, the variation in the level of the water in the tunnel 216, especially at speed, also means that the amount and flow of air in the tunnel 216 will also vary depending on a multiplicity of factors. Consequently, the velocity of the air passing through the tunnel, as well as the pressure it exerts on underside surfaces of the catamaran boat first embodiment 110 that define the tunnel 216 will vary depending on a multiplicity of factors as well. Typically, the tunnel 216 will additionally contain a froth comprised of both air and water. Tunnel roof 420 delineates the uppermost surface available to air and water passing through the tunnel 216. In general, the tunnel 216 extends longitudinally and defines tunnel transverse (i.e. perpendicular to the longitudinal dimension 102) cross-sections that are effectively pervaded by a first airstream portion that transits the tunnel 216. The tunnel transverse cross-section pervaded by the first airstream portion shown in FIG. 4 is defined by its boundaries of the tunnel roof 420 from above, the internal sponson surfaces 418 on each transverse side, and the water surface from below. These tunnel cross-sections are essentially open to transit by the first airstream portion, and the first airstream portion, in transiting the tunnel 216, moves with a general velocity vector, relative to the catamaran boat first embodiment 110, that is oriented in substantially the same direction as the general velocity vector, relative to the catamaran boat first embodiment 110. of the water surface being traversed. The first airstream portion general velocity vector, relative to the catamaran boat first embodiment 110, also transits the tunnel 216 with a magnitude (i.e. speed) that is at least a major fraction of the water surface general velocity vector, relative to the catamaran boat first embodiment 110. The tunnel roof 420 extends rearwardly from the forward inception of the tunnel 216 at the pickle forks 222 and 224 through to the transom 116. Spray guards 422 extend rearwardly form the transom 116 to the rear end of the tail 128 and define an exit path for the air and the water traveling through the tunnel 216. A tunnel tail ceiling 424 bounds from above the air and water exiting the tunnel and passing underneath the tail 128.

When an embodiment of the first type of the first category of means of interacting with aerodynamic effects utilizes an alterable aerodynamic tunnel element such as the alterable tunnel roof described earlier, the freedom of vertical movement of this alterable tunnel roof is generally within the space between the tunnel roof 420 and the tunnel tail ceiling 424. Lowering the effective tunnel roof provides the capability, when the catamaran boat first embodiment 110 is in motion, of selectively increasing the air pressure within the tunnel 216 more rapidly and by a greater amount than it would increase without lowering the effective tunnel roof. Alternatively, raising the effective tunnel roof provides the capability of selectively decreasing the air pressure within the tunnel 216. A more rapid increase in the tunnel air pressure may be desired when accelerating in order to reach a more efficient planing attitude more quickly, while a decrease in tunnel air pressure may be desired when traveling at very high speeds to reduce the risk of the catamaran boat first embodiment 110 lifting out of the water and/or flipping over. As seen in FIGS. 2 & 3, the rear wing 218 extends significantly farther in the direction that is perpendicular to the plane of FIG. 4, than it extends in the vertical direction of FIG. 4. In the embodiment depicted in FIG. 4, the rear wing 218 has a rotational axis 426 within the plane of FIG. 4 that extends from left to right side, and is essentially parallel to the catamaran's transom. Rotation of the rear wing 218 about the axis 426, when the catamaran boat first embodiment 110 is traveling at a significant speed, provides capabilities of utilizing aerodynamic effects to exert controlling influences upon the catamaran boat first embodiment 110. For example, if the trailing edge of the rear wing 218 is rotated upward, the rear wing 218 would provide a downward force by interacting with the passing air and hence the pitch of the catamaran boat first embodiment 110 would be influenced by an effective downward force on the rear portion of the catamaran boat first embodiment 110. Conversely, if the trailing edge of the rear wing 218 is rotated downward, the pitch of the catamaran boat first embodiment 110 would be influenced by an effective upward force on the rear portion of the catamaran boat first embodiment 110. In addition, if the wing is held in place as the boat first embodiment 110 pitches up (due, for example, to a wave's impact on the forward portion of the hull) the trailing edge of the rear wing 218 will be rotated downward. This downward rotation of the trailing edge of the rear wing 218 would then be at least partially countered by the air stream that the catamaran boat first embodiment 110 is traveling through and thereby provide a stabilizing torque that would tend to pitch the forward portion of the catamaran boat first embodiment 110 back downward and hence help to counter any loss of stability caused by the boat's upward pitch.

As shown in FIG. 4, the rising support members 122 are inclined inwardly from bottom to top towards the centerline of the catamaran boat first embodiment 110. This inclination enables the rising support members 122 to provide the structural support for the rear wing 218 while mitigating the potential for a destabilizing barrel roll form of torque due to cross winds. In operation, the catamaran boat first embodiment 110 will travel primarily in a direction perpendicular to the plane of FIG. 4. Depending on the speed of travel and the wave conditions, the catamaran boat first embodiment 110 can frequently be entirely separated from the water surface which it is traveling across. In such a situation, the attitude of the catamaran boat first embodiment 110 can be particularly susceptible to the influence of cross winds that have a substantial component in a direction passing from side to side of the plane of FIG. 4. It is often advantageous for the rising support members 122 to have a greater length (in the direction from the front to rear of the catamaran boat first embodiment 110) than width in the direction from side-toside of the catamaran boat first embodiment 110. The rising support members' 122 asymmetrical cross-section enables them to provide substantial support to the rear wing 218 while reducing aerodynamic drag, due to the rising support members 122, in the primary direction of travel of the catamaran boat first embodiment 110. The reduced drag benefit of the asymmetrical cross-section has a concomitant effect of increasing the surface area of the rising support members 122 that is exposed to side winds, and hence also increases the aforementioned susceptibility to barrel-roll types of torque from cross-winds. The potential consequences involved can be significant even for a relatively small skip between waves, particularly for multihull boats, since the barrel-roll torque can cause the catamaran boat first embodiment 110 to land on the water surface unevenly and thereby contribute to or even cause an asymmetrical nose dive or cartwheel by the catamaran boat first embodiment 110. The outermost surfaces of the rising support members 122 have an inward slope, from bottom to top, towards the longitudinal center line of the catamaran boat first embodiment 110. This inward slope of the outermost surfaces serves to moderate the effect of any barrel-roll inducing cross-wind torque by presenting less resistance to the flow of any cross-winds that the catamaran boat first embodiment 110 may encounter. The inward slope of the rising support members 122 also provide an additional counteracting effect that can further mitigate barrel-roll inducing torques due to cross-winds. Cross-winds that impact on the outer surfaces of the rising support members 122 will produce a force that can be decomposed into force vectors with vertical and horizontal components due to the inward slope. Since the axis of barrel-roll type rotations will be located substantially centered relative to the right and left sides of the catamaran boat first embodiment 110, and predominately located below the rising support members 122, due to the center of mass being dominated by the masses of the engines and the hull, the horizontal and vertical force components will have opposing contributions to the barrel-roll types of torques. As a barrel-roll type of motion is effected, the contribution of the horizontal component is lessened and the contribution of the vertical component is increased. Since the horizontal component induces, and the vertical component opposes the barrel-roll type of torque, the inward slope of the aerodynamic extensions 124 will also tend to counteract, at least partially, the production of any resulting barrel-roll type of motion. As this barrel-roll type of motion is happening, the relative inducing and opposing contributions will progressively shift greater contributions towards the opposing influence and lesser contributions towards the inducing influence. The capabilities of the aerodynamic extensions 124 to operate separately or in concert are shown by a prospective inward disposition 428 that the right aerodynamic extension 124 can be rotated to, and an outward disposition 430 that the left aerodynamic extension 124 is disposed in. Alternatively, the left aerodynamic extension 124 can also be rotated to an inward disposition (not shown) that is the mirror-image of inward disposition 428, and the right aerodynamic extension 124 can be rotated to an outward disposition (not shown) that is the mirror image of outward disposition 430. The inward and outward dispositions of the aerodynamic extensions 124 provide a multitude of potential capabilities by working singly or in pairs, by both moving outward or inward, or by one moving either outward or inward and the other moving in the opposite manner. The inward slopes of the rising support members 122 are a significant factor in increasing the capabilities of the aerodynamic extensions 124 to effect an even greater multitude of effects, since the rotational axes of the aerodynamic extensions 124 hence also have an inward slope. When the catamaran boat first embodiment 110 is operating at speed, the inward slopes of the rotational axes of the aerodynamic extensions 124, when one or both are disposed at least partially in inward or outward dispositions 428 or 430, respectively, will produce resultant forces on the rising support members 122 that can be decomposed into vertical and horizontal component forces. By selectively utilizing these component forces, either singly or in combinations, disposing the aerodynamic extensions 124 inwardly or outwardly can effect a greatly expanded variety of influences upon the performance of the catamaran boat first embodiment 110. Among this variety of influences are selective manners of air braking, wherein the aerodynamic extensions 124 are both rotated inward or both rotated outward. When both are rotated inward, the horizontal force components will essentially cancel, leaving a resultant net upward force that will act to lift the rearward portion of the catamaran boat first embodiment 110. When both are rotated outward, the horizontal force components will again essentially cancel, leaving a resultant net downward force that will act to lower the rearward portion of the catamaran boat first embodiment 110. It is readily apparent to those of skill in the art of utilizing aerodynamic effects that a wide variety of resulting aerodynamic influences can be effected by employing an assortment of inward and or outward rotations of varying degrees of one or both of the aerodynamic extensions 124.

Figure 5:
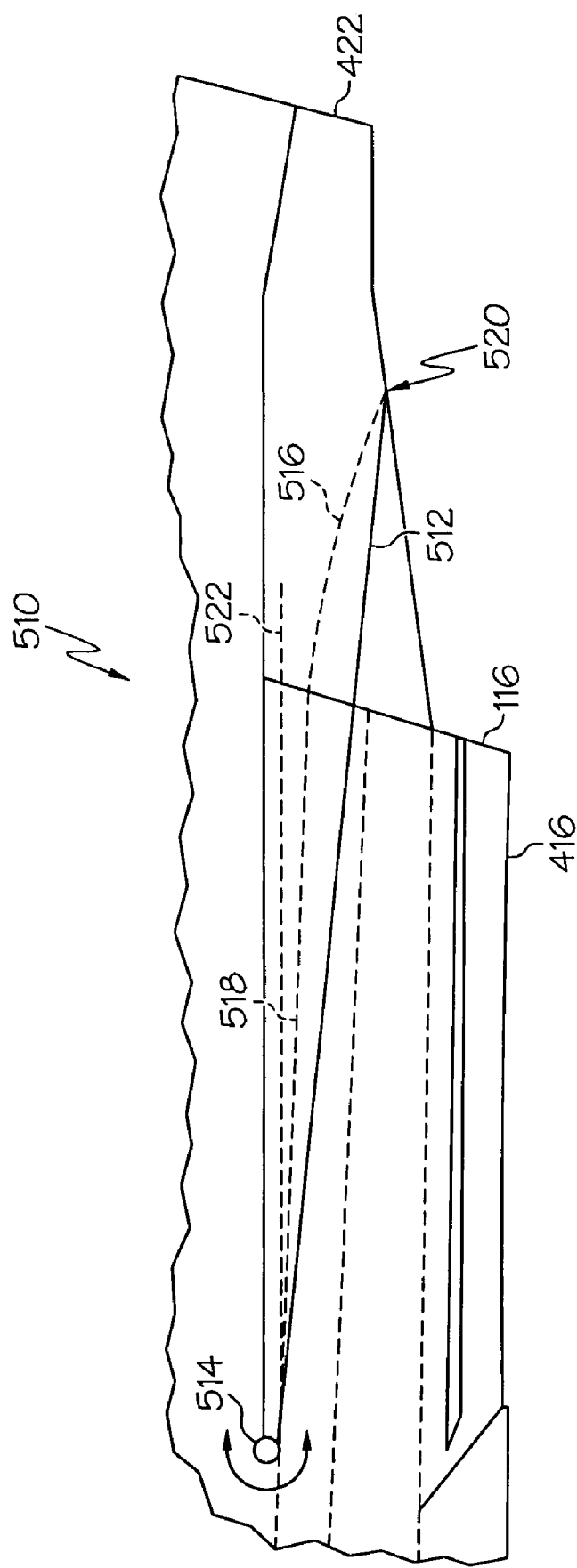
FIG. 5 depicts a side cross-section view of a rear portion 510 of the catamaran boat first embodiment 110.

FIG. 5 depicts a side cross-section view of the rear portion 510 of the catamaran boat first embodiment 110. The rear portion 510 includes a tunnel tab 512 that is rotatable about a horizontal axis 514 that is perpendicular to the plane of FIG. 5. The tunnel tab 512 as depicted in FIG. 5 can also be articulating in that when it is rotated upward about the axis 514 its rearmost section achieves an arcuate shape 516. Depending on the environmental conditions and the intentions of the operator of the catamaran boat first embodiment 110, the arcuate shape 516 and more elevated position 518 of the tunnel tab 512 are capable of providing advantages over the tunnel tab position 512. These advantages may include an overall decrease in air pressure within the tunnel 216 due to the more elevated position 518, in combination with a lift generated when the air passing through the tunnel 216 passes across the arcuate shape 516 that terminates in tunnel tab tip 520. This lift provides the capability of exerting an elevating force upon the rearmost quarter of the boat and thereby present an additional pitch tuning capacity. Alternatively, the tunnel tab position 512 can be raised to a still further elevated position 522 that provides less restriction to air flowing out of the tunnel to reduce the air pressure within the tunnel thus also reducing the lift due to air pressure and thereby provide still another pitch tuning capacity.

FIG. 6 depicts a forward facing view of the rearmost portion of the catamaran boat tunnel with a tunnel tab 512 fully deployed downward in the catamaran boat first embodiment 110. In FIG. 6, one alternative embodiment of the tunnel tab is shown as deployed fully downward, at a tunnel tab trailing tip position 610. When deployed fully upward, the tunnel tab tip 520 would be disposed at a tunnel tab trailing tip position 612. FIG. 6 illustrates that the tunnel tab 512 is thus not necessarily restrained to being entirely disposed within the confines of the tunnel 216, since the tunnel tab trailing tip position 612 is above the position that the tunnel roof would be located at without the tunnel tab 512.

FIG. 7 depicts a cross-section side view of the first combination embodiment 710 of the tunnel tab 512. In the first combination embodiment 710, the tunnel tab 512 acts as the effective tunnel roof. In the first combination embodiment 710, the range of travel of the tunnel tab 512 is limited from above by the plane 712 and by the minimum uninflated thickness of any shock absorbing mechanism. In some combination embodiments, the plane 712 would be effectively equivalent to the tunnel tail ceiling 424. The combination embodiments are characterized by the multiple functional capabilities of their tunnel tabs 512. In addition to their capabilities of selectively utilizing under boat aerodynamic effects to exert controlling influences on the catamaran in which it is disposed, the combination embodiments are also capable of providing a water-impact mitigating effect. The disposition of the tunnel tab 512 relative to the plane 712 will vary according to the operator's direction, in response to conditions and operator intentions as described earlier. For a given disposition of the tunnel tab 512, such as is illustrated in FIG. 7, the space between the tunnel tab 512 and the plane 712 also contains a shock mitigating apparatus 714. The shock mitigating apparatus 714 can be comprised of any of a wide variety of mechanisms as are well known in the art. A first embodiment of the shock mitigating apparatus 714 includes a plurality of bladders 716 disposed between the tunnel tab 512 and the plane 712. These bladders will commonly be filled with a fluid that can be gas, liquid, or some combination thereof. For purposes of ease of demonstration only, the bladders will be described as air filled, though this is not intended as limiting in any way. The bladders 716 will be connected, via a plurality of ports 718 through the plane 712, to air vents 720 that connect to an exhaust and reinflation system (not depicted). Said exhaust and reinflation system can be comprised of any of a well known variety of components, either separately for each bladder 716, or in combinations of multiple bladders 716. The exhaust and reinflation system is usually intended to hold the bladders at a selected internal air pressure, and will often include a pop-off device to vent air when the bladders 716 are compressed due to the catamaran in which they are disposed bottoming out on the water surface. Since the roof of a tunnel 216 is generally flat, the force of impact with the water when the catamaran bottoms out can be very substantial. The bladders 716 will be compressed when this impact occurs, and by elastically compressing and venting excess pressure, they will provide the capability of mitigating the force of this impact. Tunnel tab position controllers 722 determine the position of the tunnel tab 512 relative to the plane 712, and can be constructed to operate by various means including mechanical, electrical, and hydraulic means. The tunnel tab position controllers 722, operating in conjunction with the bladders 716, can also be constructed so as to contribute to mitigating the force of impact with the water.

FIG. 8 depicts a partial side cross-section view of a mechanical control device 810 of a second combination embodiment. The second combination embodiment includes a second form of shock absorbing apparatus, in which the position control of the tunnel tab 712 is effected through a combination of the bladders 716 and a plurality of the mechanical control devices 810. The mechanical control device 810 is comprised of a control line 812 that runs from a take-up spool 814, over a pulley 816, through a passage 818 in the plane 712, and continues on to connect with the tunnel tab 512. The spool 814 is shown as being comprised of a plurality of concentric reels that can each take up a separate line 812, although the second combination embodiment can also be constructed with a plurality of separate spools 814. The path of the line 812 also is constrained by a spring 820 that ensures that the line 812 is sufficiently taut to operate as planned. In the second combination embodiment the passage 818 and connection of the line 812 with the tunnel tab 512 are disposed where the tunnel tab position controllers 722 are disposed in the first combination embodiment 710. The pressure within the bladders 716 will tend to separate the tunnel tab 512 from the plane 712. This tendency is opposed by the line 812, when it is taken up by the spool 814 rotating in the clockwise direction, since it will pull up the tunnel tab 512 towards the plane 712. The spring 820 maintains the line 812 at a desired tension, and in the case of a bottoming out of the second combination embodiment causing the tunnel tab 512 to swiftly travel upward, the spring 820 will help to prevent the line 812 from fouling upon other mechanisms or separating from its reel on the spool 814.

Figure 9:
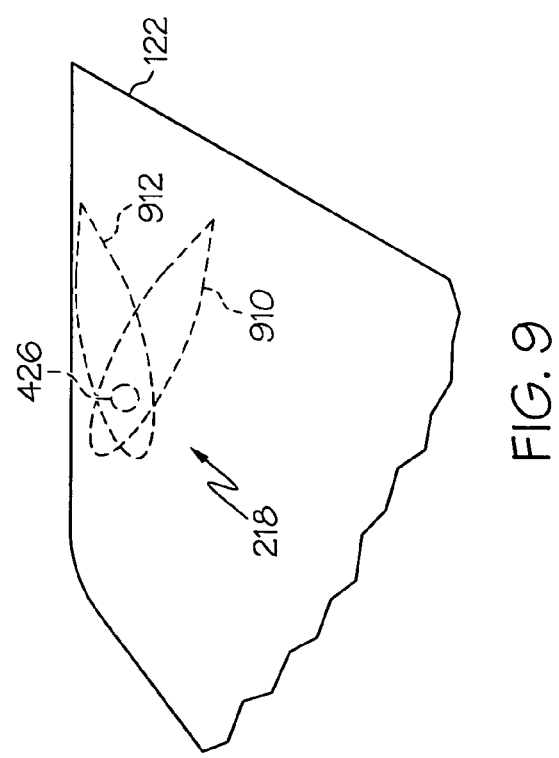
FIG. 9 depicts a side cross-section view of the upper extent of rising support members 122 along with a rear wing 218.

FIG. 9 depicts a side cross-section view of the upper extent of the rising support members 122 along with the rear wing 218. The rear wing 218 is depicted in two alternate, representative dispositions wherein the trailing edge is lowered in representative disposition 910 and the trailing edge is raised in representative disposition 912.

Figure 10:
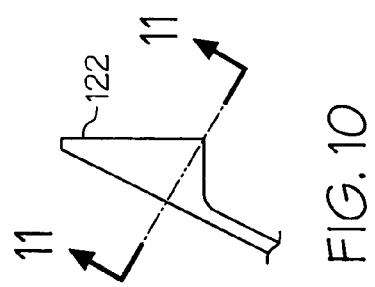
FIG. 10 depicts a rear view of the upper portion of the left rising support member 122.

FIG. 10 depicts a rear view of the upper portion of the left rising support member 122. A section line 11 indicates the view that FIG. 11 depicts.

Figure 11:
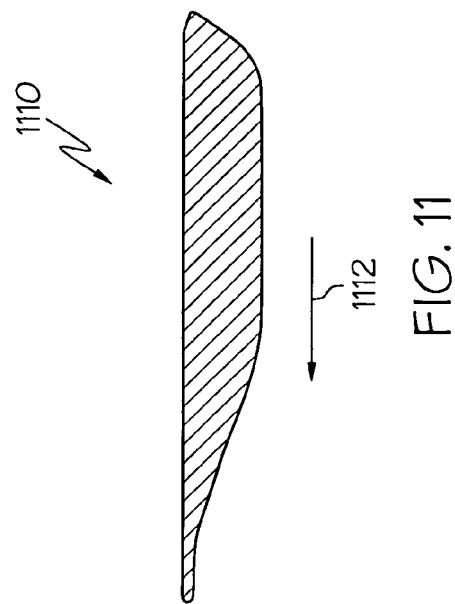
FIG. 11 depicts a cross-section view of the upper portion of the rising support member 122 along sightline 11 of FIG. 10.

FIG. 11 depicts a cross-section view 1110 of the upper portion of the rising support member 122 along section line 11 of FIG. 10. Direction arrow 1112 indicates the forward direction.

Figure 12:
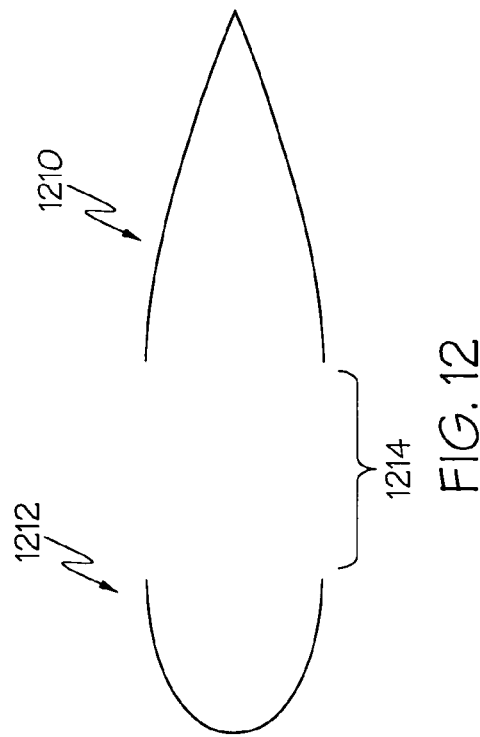
FIG. 12 depicts a cross-section view of the lower portion of the rising support members 122.

FIG. 12 depicts a cross-section view of the lower portion of the rising support members 122. Rear profile cross-section 1210 illustrates a representative example of a trailing edge contour of the lower portion of the rising support members 122, and front profile cross-section 1212 illustrates a representative example of a leading edge contour of the lower portion of the rising support members 122. The leading and trailing edge contours are separated by a generally uniform rising support member thickness 1214, and the extent of the separation is variable depending on a number of factors including the boat dimensions, construction materials and other circumstances.

FIG. 13 is a forward facing view from behind the stern of a multi-tunnel embodiment 1310 of the present invention. The coordinate system 100, as shown in FIG. 13, is disposed with the longitudinal axis 102 disposed perpendicular to the plane of FIG. 13, with its positive direction pointing out of the plane of FIG. 13 away from the viewer; the transverse axis 104 disposed within the plane of FIG. 13 with its positive direction being to the right; and the vertical axis 106 disposed within the plane of FIG. 13 with its positive direction pointing upward. As mentioned previously, the present invention is capable of being employed with multi-hull powered boats that include at least one tunnel, and are hence implicitly utilizable with multihulls that include more than one tunnel also. The multi-tunnel embodiment 1310 is highly similar to the catamaran boat first embodiment 110, with the multi-tunnel stern view showing the primary variations from the catamaran boat first embodiment 110. The multi-tunnel embodiment 1310 stern view differs from the stern 410 in that it incorporates a pair of tunnels 1312a and 1312b rather than a single tunnel 216. A tunnel divider 1314 depends downwardly between the tunnels 1312a and 1312b. Such a divided tunnel can provide a variety of functional benefits with one particularly noteworthy such benefit being the availability of the tunnel divider 1314 for structural support for a longitudinally centrally located drive assembly such as would be utilized when driving the multi-tunnel embodiment 1310 with an odd number of drives, with an I/O drive, or with a single outboard drive, among other variations. The roofs of the tunnels 1312a and 1312b are configured with appropriately scaled tunnel tabs 1316a and 1316b. The operations, dispositions, structure and effects of the tunnel tab 512 are directly applicable to the tunnel tabs 1316a and 1316b, with the appropriate scale modifications to fit within the more narrow constraints of the tunnels 1312a and 1312b, and with the optional duplication of the various apparatuses involved in driving and controlling the tunnel tab 512 so that each of the tunnel tabs 1316a and 1316b are separately operable. It is also possible to operate the tunnel tabs 1316a and 1316b with a single set of these various tunnel tab drive and control apparatuses, with both of the tunnel tabs 1316a and 1316b being driven and controlled by the same operational and control assembly and receiving essentially matching effects.

A broad range of means of controlling and coordinating the alterable components are within the scope of the present invention. These means of controlling and coordinating include, but are not limited to, mechanical linkages, hydraulic and air pressure operated mechanisms, electrical switches and sensors, and combinations thereof. The various controls are capable of being multi-functional so that, for example, the same switch may control multiple alterable elements simultaneously; as well as being capable of having single dedicated functions. The actuators of the various control systems also have the capabilities of similarly functioning in various combinations as well as alternatively having separately dedicated functions. An additional functional flexibility provided by the present invention are capabilities of the various control, coordination, and actuating components both to operate with varied interrelations and to switch between combined and singular operating modes, or differing interrelated modes, even while in operation. The systems of the present invention also have capabilities of integrating an array of sensing systems. The various means of operation such as mechanical, hydraulic, or electric that are available to the control, coordination, and actuation systems are also available to the sensing systems of the present invention. Additionally, the information synthesis and command system can operate through manual control of the operator, or through control of well known information processing systems, or combinations thereof. In operation and/or construction, the sensors and control systems of the present invention may be continuous or intermittent; linear or non-linear; position, attitude, rate, and/or external condition responsive; and/or open loop or include a feed back path.

In view of the above, it will be seen that the various objects and features of the present invention are achieved and other advantageous results obtained. The examples contained herein are merely illustrative and are not intended in a limiting sense.

What is claimed is:

1. A system capable of influencing aerodynamic effects upon a powered multihull boat when said boat is in powered motion comprising:

a powered boat incorporating a generally contiguous deck extending across said boat's transverse width and a multihull having at least one longitudinally extending tunnel formed therein, said longitudinally extending tunnel defining open transverse tunnel cross-sections for longitudinal transiting therethrough of a first portion of an air stream said boat is traveling through, said air stream first portion effectively pervading said open transverse tunnel cross-sections when transiting said tunnel, said open transverse tunnel cross-sections allowing said first air stream portion to transit with a general velocity vector, relative to said boat, of substantially the same direction as and with a magnitude that is at least a major fraction of the direction and magnitude, relative to said boat, of a general water surface velocity vector;

at least one aerodynamic element capable of interacting with the air stream the powered boat travels through when in powered motion, said aerodynamic element being selectively alterable in disposition while the powered boat is in powered motion, said alterable disposition of the aerodynamic element being capable of influencing the powered boat's response to aerodynamic effects, said aerodynamic element dispositions including a maximally elevated first disposition and at least one less elevated second disposition, wherein at least one of said aerodynamic elements is selectively disposable so that said aerodynamic element, when in said less elevated second disposition, interacts with said first air stream portion and said aerodynamic element, when in said maximally elevated first disposition, does not interact with a second portion of the airstream passing over a part of said contiguous deck; said transverse tunnel cross-sections of an aft half of said tunnel, absent said aerodynamic elements, being relatively proportioned such that more aftward transverse cross-sections are substantially not progressively narrower than less aftward transverse cross-sections; and at least one supplementary aerodynamic element, said supplementary aerodynamic element providing said system with an auxiliary capability of influencing the powered boat's response to aerodynamic effects by interacting with at least one of a third and said second portions of the air stream, wherein said third portion of the air stream both does not pass through any of the tunnels formed within the multihull of said powered multihull boat and does not pass over a part of said contiguous deck.

2. The system capable of influencing aerodynamic effects upon a powered boat when said powered boat is in powered motion according to claim 1, said at least one tunnel formed within the multihull having cross-sections which may vary along the length of the powered multihull boat, wherein said alterable disposition aerodynamic element is capable of selectively altering an effective cross-section of at least a portion of at least one tunnel formed within said multihull, said effective cross-section delineating an area available for air passage therethrough.

3. The system capable of influencing aerodynamic effects upon a powered boat when said powered boat is in powered motion according to claim 1, wherein at least one of said alterable disposition aerodynamic elements is interconnected with at least a portion of at least one tunnel roof section of said multihull.

4. The system capable of influencing aerodynamic effects upon a powered boat when said powered boat is in powered motion according to claim 3, wherein said alterable disposition aerodynamic element is a tunnel tab capable of pivoting about at least one horizontal axis, said tunnel tab horizontal pivot axis disposed approximately transverse to the powered boat's primary direction of powered motion and located in the general proximity of the tunnel tab's leading edge.

5. The system capable of influencing aerodynamic effects upon a powered boat when said powered boat is in powered motion according to claim 4, said tunnel tab being further capable of being alterable in disposition in response to contact with the water the powered boat is traversing, wherein said alterable disposition of the tunnel tab in response to said water contact is capable of mitigating at least one force imparted to the powered boat by said water contact.

6. The system capable of influencing aerodynamic effects upon a powered boat when said powered boat is in powered motion according to claim 1, wherein at least one of said alterable disposition aerodynamic elements is interconnected with at least a portion of at least one tunnel side section of said multihull.

7. The system capable of influencing aerodynamic effects upon a powered boat when said powered boat is in powered motion according to claim 1, said alterable disposition aerodynamic element being further capable of being alterable in disposition in response to contact with the water the powered boat is traversing, wherein said alterable disposition of the aerodynamic element in response to said water contact is capable of mitigating at least one force imparted to the powered boat by said water contact.

8. The system capable of influencing aerodynamic effects upon a powered boat when said powered boat is in powered motion according to claim 1, wherein said supplementary aerodynamic element includes a supplementary aerodynamic element support structure, said supplementary aerodynamic element support structure adapted to maintain the supplementary aerodynamic element in a disposition above a deck of the powered boat, said support structure fixedly interconnected with said powered boat at an inclination to the vertical such that a transversely outermost surface of an upper extent of the supplementary aerodynamic element support structure is fixedly disposed closer to a longitudinal center line of the powered boat's multihull than is a transversely outermost surface of a lower extent of the supplementary aerodynamic element support structure.

9. The system capable of influencing aerodynamic effects upon a powered boat when said powered boat is in powered motion according to claim 8, wherein the outermost surface of said supplementary aerodynamic element support structure has a general inclination relative to vertical, said general inclination falling substantially within the range of approximately 15 to 60 degrees relative to vertical.

10. The system capable of influencing aerodynamic effects upon a powered boat when said powered boat is in powered motion according to claim 1, wherein said supplementary aerodynamic element comprises a selectively shaped modification of at least portion of a general surface of a deck of said powered boat, said modification of the portion of the general deck surface being substantially nonplanar.

11. The system capable of influencing aerodynamic effects upon a powered boat when said powered boat is in powered motion according to claim 1, wherein at least one of said supplementary aerodynamic elements is an inclined supplementary aerodynamic element, said inclined supplementary aerodynamic element being selectively alterable in disposition while the powered boat is in powered motion, said alterable disposition of the inclined supplementary aerodynamic element being capable of influencing the powered boat's response to aerodynamic effects, and said inclined supplementary aerodynamic element being interconnected with the powered boat at an angle of inclination that lies between the vertical and horizontal, relative to the powered boat's stationary orientation, such that the inclined supplementary aerodynamic element, when selectively disposed to produce an interaction with at least one of said second and third portions of the air stream, provides an influence on the powered boat's response to aerodynamic effects that includes non-zero force components in both the vertical and horizontal directions, relative to the powered boat's stationary orientation.

12. The system capable of influencing aerodynamic effects upon a powered boat when said powered boat is in powered motion according to claim 11, wherein at least one of said inclined supplementary aerodynamic elements is selectively rotatable about at least one main axis of rotation, said main axis of rotation fixedly oriented at an inclination that incorporates non-negligible vertical and transverse components, and said rotatable inclined supplementary aerodynamic element, when selectively rotated so as to produce an interaction with at least one of said second and third portions of the air stream, is capable of providing an influence on the powered boat's response to aerodynamic effects that includes non-zero force components in both the vertical and transverse directions.

13. The system capable of influencing aerodynamic effects upon a powered boat when said powered boat is in powered motion according to claim 11, including at least a first and a second inclined supplementary aerodynamic elements, wherein said first and second inclined supplementary aerodynamic elements are symmetrically arranged, relative to the powered boat's longitudinal direction, such that said first and second inclined supplementary aerodynamic elements are capable of being selectively disposed so as to collectively function as an air brake and are capable of being selectively disposed so as to collectively provide an influence on the powered boat's response to aerodynamic effects that includes a net force in the vertical direction, and does not include a substantial net force in the transverse direction, relative to the powered boat's stationary orientation.

14. The system capable of influencing aerodynamic effects upon a powered boat when said powered boat is in powered motion according to claim 13, wherein at least one of said inclined aerodynamic elements is selectively rotatable about at least one main axis of rotation, said main axis of rotation oriented at an inclination that incorporates non-negligible vertical and horizontal components, and said rotatable inclined aerodynamic element, when selectively rotated so as to produce an interaction with at least one of said second and third portions of the air stream, is capable of providing an influence on the powered boat's response to aerodynamic effects that includes non-zero force components in both the vertical and transverse directions.

15. A method of selectively influencing aerodynamic effects upon a powered multihull boat when said boat is in powered motion comprising the steps of:

traversing a water surface in a powered boat incorporating a generally contiguous deck extending across said boat's transverse width and a multihull having at least one longitudinally extending tunnel formed therein, said longitudinally extending tunnel defining open transverse tunnel cross-sections for longitudinal transiting therethrough of a first portion of an air stream said boat is traveling through, said air stream first portion effectively pervading said open transverse tunnel cross-sections when transiting said tunnel, said open transverse tunnel cross-sections allowing said first air stream portion to transit with a general velocity vector, relative to said boat, of substantially the same direction as and with a magnitude that is at least a major fraction of the direction and magnitude, relative to said boat, of a general water surface velocity vector, said transverse tunnel cross-sections of an aft half of said tunnel, absent at least one aerodynamic element disposed within said tunnel, being relatively proportioned such that more aftward transverse cross-sections are substantially not progressively narrower than less aftward transverse cross-sections;

selectively interacting with said air stream first portion with said at least one aerodynamic element, said aerodynamic element being selectively alterable in disposition while the powered boat is in powered motion, said alterable disposition of the aerodynamic element being capable of influencing the powered boat's response to aerodynamic effects by effecting said selective interaction with the air stream, said aerodynamic element dispositions including a maximally elevated first disposition and at least one less elevated second disposition;

selectively disposing said aerodynamic element so that said aerodynamic element, when in said less elevated second disposition, interacts with said first air stream portion and said aerodynamic element, when in said maximally elevated first disposition, does not interact with a second portion of the airstream passing over a part of said contiguous deck; and disposing at least one supplementary aerodynamic element so as to be capable of influencing the powered boat's response to aerodynamic effects by interacting with at least one of said second portion and a third portion of the air stream, said third portion of the air stream not passing through any of the tunnels formed within the multihull of said powered multihull boat and not passing over a part of said contiguous deck.

16. The method of selectively influencing aerodynamic effects upon a powered boat when said powered boat is in powered motion according to claim 15, said at least one tunnel formed within the multihull having cross-sections which may vary along the length of the powered multihull boat, wherein said aerodynamic element selectively interacting with the first portion of the air stream is effected by the aerodynamic element selectively altering an effective cross-section of at least a portion of at least one tunnel formed within said multihull, said effective cross-section delineating an area available for air passage therethrough.

17. The method of selectively influencing aerodynamic effects upon a powered boat when said powered boat is in powered motion according to claim 15, wherein said alterable disposition aerodynamic element is a tunnel tab capable of pivoting about at least one horizontal axis, said tunnel tab horizontal pivot axis disposed approximately transverse to the powered boat's primary direction of powered motion and located in the general proximity of the tunnel tab's leading edge.

18. The method of selectively influencing aerodynamic effects upon a powered boat when said powered boat is in powered motion according to claim 17, wherein said tunnel tab is capable of altering its disposition in response to contact with the water the powered boat is traversing, and said tunnel tab, by altering its disposition in response to said water contact, is capable of mitigating at least one force imparted to the powered boat by said water contact.

19. The method of selectively influencing aerodynamic effects upon a powered boat when said powered boat is in powered motion according to claim 15, wherein said alterable disposition aerodynamic element is capable of altering its disposition in response to contact with the water the powered boat is traversing, and said aerodynamic element, by altering its disposition in response to said water contact, is capable of mitigating at least one force imparted to the powered boat by said water contact.

20. The method of selectively influencing aerodynamic effects upon a powered boat when said powered boat is in powered motion according to claim 15, wherein at least one of said supplementary aerodynamic elements is an inclined supplementary aerodynamic element, said inclined supplementary aerodynamic element being selectively alterable in disposition while the powered boat is in powered motion, said alterable disposition of the inclined supplementary aerodynamic element being capable of influencing the powered boat's response to aerodynamic effects, and said inclined supplementary aerodynamic element is interconnected with the powered boat at an angle of inclination that incorporates non-negligible vertical and transverse components, and selectively disposing the inclined supplementary aerodynamic element so that the inclined supplementary aerodynamic element interacts with at least one of said second and third portions of the air stream to produce an influence on the powered boat's response to aerodynamic effects that is capable of including non-zero force components in both the vertical and transverse directions.

21. The method of selectively influencing aerodynamic effects upon a powered boat when said powered boat is in powered motion according to claim 20, further including at least a first and a second inclined supplementary aerodynamic elements, wherein said first and second inclined supplementary aerodynamic elements are symmetrically arranged, relative to the powered boat's primary direction of travel, and selectively disposing said first and second inclined supplementary aerodynamic elements so that the first and second inclined supplementary aerodynamic elements are collectively capable of acting as an air brake and are collectively capable of providing an influence on the powered boat's response to aerodynamic effects that includes a net force in the vertical direction and does not include a substantial net force in the transverse direction.

22. The system capable of influencing aerodynamic effects upon a powered boat when said powered boat is in powered motion according to claim 1, further comprising:

at least one tunnel roof shock absorbing apparatus interconnected with said multihull, said tunnel roof shock absorbing apparatus being alterable in disposition while said powered boat is in powered motion, wherein said tunnel roof shock absorbing apparatus is capable of mitigating shocks imparted to the powered boat when the powered boat impacts the water sufficiently hard enough to force the water into contact with at least a portion of a tunnel roof part of said multihull.

23. The system capable of mitigating water impact effects upon a powered boat when said powered boat is in powered motion according to claim 22, wherein said tunnel roof shock absorbing apparatus is a tunnel tab capable of pivoting about at least one horizontal axis, said tunnel tab horizontal pivot axis disposed approximately transverse to the powered boat's primary direction of powered motion and located in the general proximity of the tunnel tab's leading edge.

* * * * *